United States Patent [19]
Forchini et al.

[11] 3,877,676
[45] Apr. 15, 1975

[54] FLOW CONTROL VALVE
[75] Inventors: James F. Forchini, Healdsburg; John L. Sylvester, Santa Rosa, both of Calif.
[73] Assignee: Ecodyne Corporation, Lincolnshire, Ill.
[22] Filed: Apr. 1, 1974
[21] Appl. No.: 457,017

[52] U.S. Cl. ............... 251/145; 251/101; 251/144; 251/215
[51] Int. Cl. ........................ F16k 31/50; F16k 1/50
[58] Field of Search ........... 251/144, 145, 146, 215, 251/218, 147, 101

[56] References Cited
UNITED STATES PATENTS

| | | | |
|---|---|---|---|
| 1,473,474 | 11/1923 | Drake | 251/144 X |
| 2,139,280 | 12/1938 | McBride | 251/144 X |
| 2,190,723 | 2/1940 | McBride | 251/144 X |
| 2,417,901 | 3/1947 | Bagsar | 251/218 |
| 3,089,677 | 5/1963 | Savaria | 251/144 X |

Primary Examiner—William R. Cline
Attorney, Agent, or Firm—Joel E. Siegel; Charles M. Kaplan

[57] ABSTRACT

A flow control valve for mating with large diameter fiberglass pipe. A threaded valve stem, housed within a tubular support assembly, extends through the fiberglass pipe. Rotation of the valve stem raises and lowers a cast metal stopper disc assembly within a fiberglass body, secured to the pipe around a discharge opening formed therein. The stopper disc assembly has a seal around its perimeter which seals against a flanged seat portion of the body when the stopper disc assembly is in its raised position. A pair of guide pins extend through the bottom end of the support assembly and are received in corresponding slots cast in the stopper disc assembly to prevent rotation of the disc by the discharge of liquid. Circular rubber gland type seals are provided around the tubular support assembly at the point where the stopper disc slides up and down on the support tube and around a floating seal retainer at the point where the tubular support assembly penetrates the fiberglass pipe.

10 Claims, 3 Drawing Figures

3,877,676

FLOW CONTROL VALVE

BACKGROUND AND SUMMARY OF THE INVENTION

The present invention relates to a flow control valve specifically designed to mate with large diameter fiberglass pipe of the type used to distribute water within a cooling tower.

It is now well known in the cooling tower industry to use large diameter fiberglass pipe to distribute water to be cooled onto the top deck of a cooling tower. Fiberglass pipe offers greater strength, fire resistance, and hydraulic performance than heretofore used redwood pipe and is virtually free from maintenance problems. The fiberglass pipe has distribution valves associated therewith for control of the water distribution onto the top deck of the tower. In the past these valves, being of metallic construction and therefore having different flexural rigidity than the fiberglass pipe, have caused excess strain to the fiberglass at the point where the valves join the pipe. Heretofore known valves have additionally required maintenance at a greater frequency than is acceptable to the industry.

Accordingly, it is a primary object of the present invention to provide a valve assembly made from corrosion and erosion resistant metals which is designed to mate with a large diameter fiberglass pipe without causing excess strain to the fiberglass.

It is a further object of the present invention to provide a valve assembly which offers minimum impedance to flow through the pipe and a minimum of losses created at the point of discharge.

Another object of the present invention is to provide a disc type valve assembly which includes means to prevent rotation of the valve disc by the discharge of liquid.

A still further object is to provide a valve assembly for use with large diameter fiberglass pipe which is structurally strong and virtually free from maintenance.

In accordance with the present invention, a threaded valve stem, which is housed in a tubular support assembly, extends through the fiberglass pipe. By turning the stem in the support assembly, a cast metal stopper disc assembly attached to the bottom of the stem is raised or lowered inside a fiberglass body, secured to the pipe around a discharge opening formed therein. The stopper disc assembly has a neoprene seal at its perimeter which seals against a flanged seat portion of the body when the stopper disc is in its raised or shut-off position. A pair of guide pins extend through the bottom end of the support assembly and are received in corresponding slots cast in the stopper disc assembly to prevent rotation of the disc by the discharge of liquid. Circular rubber gland type seals are provided around the tubular support assembly at the point where the stopper disc slides up and down on the support tube and around a floating seal retainer at the point where the tubular support assembly penetrates the fiberglass pipe.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF A PREFERRED EMBODIMENT

Figure 1:
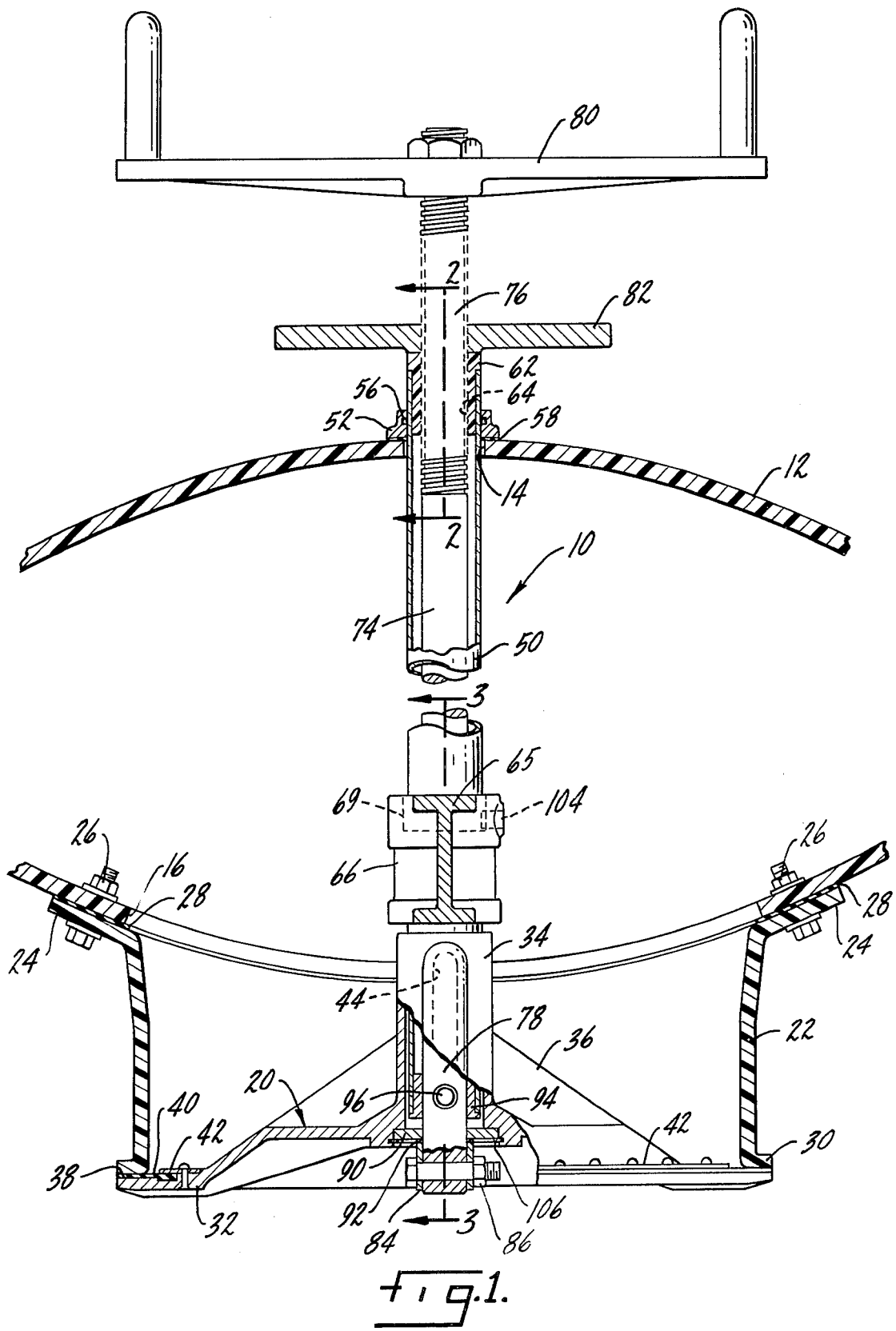
FIG. 1 is a vertical sectional view taken through a valve assembly constructed in accordance with the present invention.

Referring to FIG. 1, a valve assembly 10, constructed in accordance with the present invention, is shown secured to a large diameter fiberglass pipe 12 of a type used in the water distribution system of a cooling tower. A small diameter opening 14 is cut through a top portion of pipe 12 and a larger diameter opening 16 is cut through a bottom portion of pipe 12 in vertical alignment with opening 14.

Valve assembly 10 includes a valve stopper disc assembly 20 movable in closing relationship to a valve body member 22. Valve body member 22 is a tubular member having a diameter substantially equal to the diameter of opening 16. Extending outward from the upper edges of body 22 is an annular flange 24 which is secured to the outside of pipe 12 around opening 16 by a plurality of nut and bolt assemblies 26 passing through flange 24 and pipe 12. Flange 24 is formed to conform to the curvature of pipe 12 and a gasket 28 is provided to ensure a fluid tight seal between body 22 and pipe 12. A valve seat 30 extends radially outward from the lower edges of body 22 in the nature of an annular flange formed integral with body 22. Valve body member 22 is preferably formed from a fiberglass material.

Figure 3:
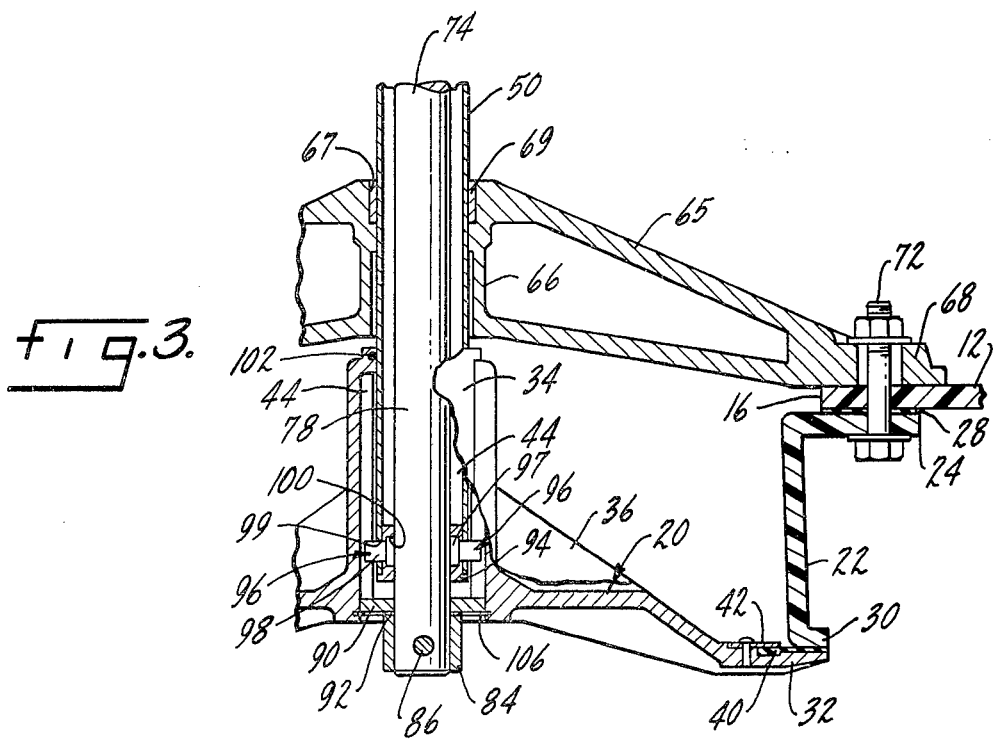
FIG. 3 is an enlarged sectional view taken along line 3—3 in FIG. 1.

Valve stopper disc assembly 20 is cast of a suitable metallic material so as to define a disc portion 32, an upwardly extending central hollow hub portion 34, and a plurality of stiffening wings 36 extending between disc 32 and hub 34. Disc 32 has an annular recess 38 formed about the periphery of the top surface thereof for receipt of an annular neoprene gasket seal 40 therein. An annular plate 42 riveted to disc 32 overlaps the inner periphery of seal 40 and holds it securely in position within recess 38. When disc 32 is in its closed or upward position, seal 40 is in contact with seat 30 to effectively closs off fluid flow through body 22. Referring to FIGS. 1 and 3, hub 34 is open at its top and bottom ends and includes a pair of diametrically opposed vertical slots 44 integrally cast therein, the significance of which will hereinbelow become more apparent.

Figure 2:
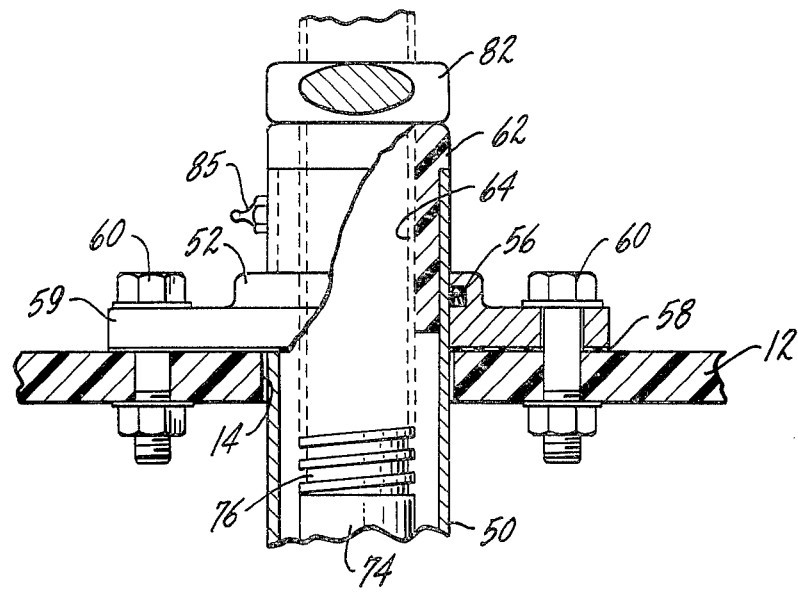
FIG. 2 is an enlarged sectional view taken along line 2—2 in FIG. 1.

A hollow tubular support member 50 extends downward through opening 14 and pipe 12 into hub 34. An annular valve seal boss 52 is provided around the support tube 50 immediately above the point where the tube 50 penetrates opening 14. An annular recess is formed in the surface of boss 52 which contacts tube 50 for receipt of a rubber gland seal or U-packing 56 therein. A gasket seal 58 is provided around tube 50 between a flange portion 59 of boss 52 and pipe 12. Boss 52 is secured to pipe 12 by nut and bolt assemblies 60 which pass through flange 59, gasket 58, and pipe 12, as seen in FIG. 2. An insert 62, having a threaded opening 64 therethrough, is rigidly secured to the upper end of support tube 50 in closing relationship thereto.

A cast tube support member 65 is provided having a central hub portion 66, for receiving tube 50 therethrough and end portions 68 which are secured to pipe 12. A recess 67 is formed in an upper portion of hub portion 66 which receives a sleeve member 69 secured around the outer surface of tube 50 so as to vertically support tube 50 in a predetermined vertical position. Sleeve 69 is secured in hub portion 66 by a set bolt 104. Set bolt 104 is received in a hole in sleeve member 69. The end portions 68 are secured to pipe 12 by a corresponding nut and bolt assembly 72 which passes through the respective end portions 68, pipe 12, gasket 28, and flange 24. bolt A valve stem 74 is received within support tube 50 and has a threaded upper end 76 which extends above the upper end of tube 50 and a lower end 78 which extends below the lower end of tube 50. Upper end 76 is threadedly received within opening 64 of insert 62 such that the rotation of stem 74 within insert 62 is effective to raise and lower the lower end 78 relative to the disc assembly 20. Secured to the upper end 76 is a valve handle 80 for facilitating rotation of stem 74. A locking handle 82 is threadedly received around stem 74 between handle 80 and insert 62 for locking stem 74 in any predetermined position upon handle 82 contacting the upper surface of insert 62. A lube fitting 85 is provided through tube 50 and insert 62 for permitting the lubrication of stem 74.

As best seen in FIG. 1, a retaining sleeve 84 is secured to lower end 78 by a nut and bolt assembly 86 passing therethrough. A retaining ring 90 is received within and secured to hub 34 with an internal type of snap ring 106 immediately below slots 44. A thrust bearing 92 is preferably positioned between retaining sleeve 84 and retaining ring 90. Disc assembly 20 is thereby supported on bearing 92 and sleeve 84 through the retaining ring 90.

A guide bushing 94 is received within the lower end of tube 50 around stem 74, as best seen in FIG. 3. A pair of guide pins 96 are provided having inner portions 97, which are supported within bushing 94 and outer portions 98, which extend through openings 99 in tube 50 into a corresponding slot 44. Guide pins 96 are retained in place by a recess 100 formed in bushing 94 and by the stem 74. Pins 96 permit the vertical movement of disc assembly 20 as they slide up and down the slots 44 while effectively preventing rotational movement of the disc assembly 20. A rubber gland seal or U-packing 102 is received within a recess in hub portion 34 for sealing contact with tube 50 so as to permit vertical movement of disc assembly 20 relative thereto.

In operation, with the valve assembly 10 in its shutoff position as shown in FIGS. 1–3, the disc assembly 20 is in its up position causing seal 40 to contact valve seat 30 preventing the flow of liquid through body 22. Locking handle 82 is in contact with insert 62 to lock valve assembly 10 in its shut-off position and/or to prevent further upward movement. The guide pins 96 are in the lower sections of slots 44 and the upper end of hub 34 is positioned about tube 50 a short distance below support member 65.

To open valve assembly 10, the locking handle 82 is rotated about stem 74 to a predetermined position between insert 62 and handle 80. Handle 80 is then rotated causing stem 74 to rotate and move downward through tube 50 until handle 80 contacts locking handle 82. As the stem and consequently retaining stem 84 secured thereto move vertically downward, the weight of disc assembly 20 and the liquid supported thereabove cause disc assembly 20 to slide downward about tube 50 with retaining ring 90 remaining in contact with bearing 92 and retaining sleeve 84. The guide pins 96 slide within slots 44 as hub portion 34 moves downward to help inter-lock the valve assembly and prevent rotation of the disc assembly 20 by the discharge of liquid. The lowering of disc assembly 20 causes seal 40 to become disengaged from seat 30 and permits the passage of liquid therebetween. The flow rate of liquid from pipe 12, passing through valve assembly 10, can be controlled by controlling the vertical movement of disc assembly 20 and consequently the spacing between seal 40 and seat 30. The positioning of locking handle 82 between insert 62 and handle 80 determines the distance which disc assembly 20 can be lowered and thereby determines the flow rate through the valve assembly.

The valve assembly 10, constructed in accordance with the present invention, is specifically designed to perform at low pressures and mate with large diameter fiberglass pipe. The gland type seals 56 and 102 respectively provide sealing around tube 50 at the points where disc assembly 20 slides up and down on the tube 50 and adjacent the boss 52 which results in a floating type seal at the point where tube 50 penetrates pipe 12. It is this unique structural arrangement which compensates for the differences in flexural rigidity between the metal valve assembly 10 and the fiberglass pipe 12 and precludes excess strain to the fiberglass at the point where they are joined. Another feature of the present invention is the manner in which guide pins 96 cooperate with the slots 44 in hub 34 to inter-lock the valve assembly 10 and prevent rotation of the disc assembly 20 by the discharge of liquid. By positioning guide pins 96 within hub 34, they are not in contact with the liquid and therefore are not likely to require frequent maintenance. The support tube 50, being supported by boss 52, support member 65, and hub 34 along its length, is substantially free from wobbling.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A flow control valve assembly for use in controlling liquid flow through a large diameter pipe, comprising:
   a. a valve body member secured to the outside of said pipe around a discharge opening through a bottom section of said pipe;
   b. a valve disc assembly means for selectively closing off liquid flow through said valve body member;
   c. said disc assembly means including a disc portion having a seal associated therewith movable between a first position in sealing relationship to said body member and a second position spaced from said body member, and a centrally disposed hollow hub portion extending upwardly into said valve body;
   d. a support tube means extending diametrically through said pipe and having an upper end portion secured to a top portion of said pipe and a bottom end portion slideably received within said hub portion of said disc assembly means;
   e. a threaded valve stem means extending through said support tube means;

f. said valve stem means having an upper end threadedly received through an insert secured to said upper end portion of said support tube means and a lower end extending through said hub portion of said disc assembly means;

g. translating means associated with said lower end of said stem means for contacting a bottom surface of said disc assembly means and thereby translating vertical movement of said valve stem means to said disc assembly means;

h. pin means extending through said support tube means and received within vertical slots formed within said hub portion of said disc assembly means so as to prevent rotation of said disc assembly means about said support tube means; and i. handle means secured to said stem means for rotation of said stem means about a substantially vertical axis.

2. The invention as defined in claim 1 wherein said valve body member is a substantially tubular member having an upper flange for connection to said pipe and a lower flange positioned for engagement with said seal.

3. The invention as defined in claim 2 wherein said valve body member is integrally formed from a fiberglass material.

4. The invention as defined in claim 1 wherein said disc portion has a recess formed in an upper surface thereof for receipt of said seal therein and an annular plate secured to said upper surface retains said seal in position.

5. The invention as defined in claim 1 further including a support member for supporting said tube means in a substantially vertical position.

6. The invention as defined in claim 5 wherein said support member includes a central hub portion which receives said tube means therethrough and a pair of end portions which are secured to said pipe.

7. The invention as defined in claim 1 further including locking means threadedly received about said stem means between said insert and said handle means.

8. The invention as defined in claim 1 further including a boss means positioned about said tube means and rigidly secured to the outside of said pipe, said boss means having a gland type seal means received within a recess formed integral therewith for causing a floating seal between said tube means and said pipe.

9. The invention as defined in claim 1 wherein said translating means includes a sleeve means rigidly secured to said lower end of said stem means and a retaining ring rigidly secured to said hub portion of said disc assembly means.

10. A flow control valve assembly for use in controlling liquid flow through a large diameter fiberglass pipe, comprising:

a. a valve body member secured to the outside of said pipe around a discharge opening through a bottom section of said pipe;

b. a valve disc assembly means for selectively closing off liquid flow through said valve body member;

c. said disc assembly means including a disc portion having a seal associated therewith movable between a first position in sealing relationship to said body member and a second position spaced from said body member, and a centrally disposed hollow hub portion extending upwardly into said valve body;

d. a metallic support tube means extending diametrically through said fiberglass pipe and having an upper end portion secured to a top portion of said fiberglass pipe and a bottom end portion slideably received within said hub portion of said disc assembly means;

e. a boss means positioned about said tube means and rigidly secured to the outside of said fiberglass pipe;

f. said boss means having a gland type seal means received within a recess formed integral therewith for causing a floating seal between said tube means and said fiberglass pipe so as to prevent the formation of excess stress to the fiberglass pipe where it is secured to said tube means;

g. a threaded valve stem means extending through said support tube means;

h. said valve stem means having an upper end threadedly received through an insert secured to said upper end portion of said support tube means and a lower end extending through said hub portion of said disc assembly means;

i. translating means associated with said lower end of said stem means for contacting a bottom surface of said disc assembly means and thereby translating vertical movement of said valve stem means to said disc assembly means;

j. pin means extending through said support tube means and received within vertical slots formed within said hub portion of said disc assembly means so as to prevent rotation of said disc assembly means about said support tube means; and k. handle means secured to said stem means for rotation of said stem means about a substantially vertical axis.

* * * * *